(12) United States Patent
Park et al.

(10) Patent No.: US 9,544,916 B2
(45) Date of Patent: Jan. 10, 2017

(54) METHOD AND APPARATUS FOR INITIAL ACCESS OVER WIRELESS LAN

(71) Applicant: LG ELECTRONICS INC., Seoul (KR)

(72) Inventors: Giwon Park, Anyang-si (KR); Kiseon Ryu, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 14/406,406

(22) PCT Filed: Jun. 18, 2013

(86) PCT No.: PCT/KR2013/005372
§ 371 (c)(1),
(2) Date: Dec. 8, 2014

(87) PCT Pub. No.: WO2013/191447
PCT Pub. Date: Dec. 27, 2013

(65) Prior Publication Data
US 2015/0189673 A1 Jul. 2, 2015

Related U.S. Application Data

(60) Provisional application No. 61/660,823, filed on Jun. 18, 2012, provisional application No. 61/662,879, filed on Jun. 21, 2012.

(51) Int. Cl.
*H04W 74/00* (2009.01)
*H04W 48/08* (2009.01)
*H04W 76/02* (2009.01)
*H04W 84/12* (2009.01)

(52) U.S. Cl.
CPC ............ *H04W 74/002* (2013.01); *H04W 48/08* (2013.01); *H04W 76/022* (2013.01); *H04W 84/12* (2013.01)

(58) Field of Classification Search
None
See application file for complete search history.

(56) References Cited

U.S. PATENT DOCUMENTS

2005/0025176 A1* 2/2005 Ko ................. H04W 74/085 370/448
2007/0230389 A1* 10/2007 Amann ............ H04W 72/1242 370/314

FOREIGN PATENT DOCUMENTS

| KR | 10-2006-0046019 A | 5/2006 |
| KR | 10-2009-0008387 A | 1/2009 |
| KR | 10-2009-0045377 A | 5/2009 |
| KR | 10-2010-0130535 A | 12/2010 |

\* cited by examiner

*Primary Examiner* — Kouroush Mohebbi
(74) *Attorney, Agent, or Firm* — Denton US LLP

(57) ABSTRACT

Disclosed are a method and an apparatus for an initial access over a wireless LAN. The method for an initial access by a station (STA) comprises: a step in which the STA receives initial access setup information from an access point (AP); and a step in which the STA determines whether to implement the initial access on the basis of the initial access setup information and the initial access decision information of the STA. Accordingly, the initial access of the STA can be distributed.

4 Claims, 17 Drawing Sheets

FIG. 1
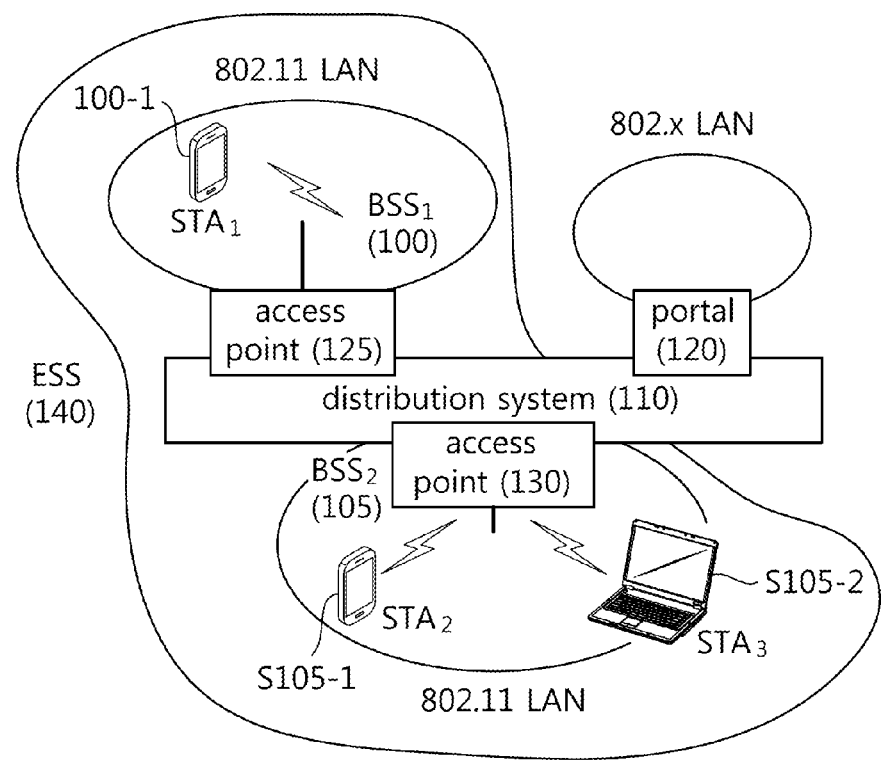
(A)
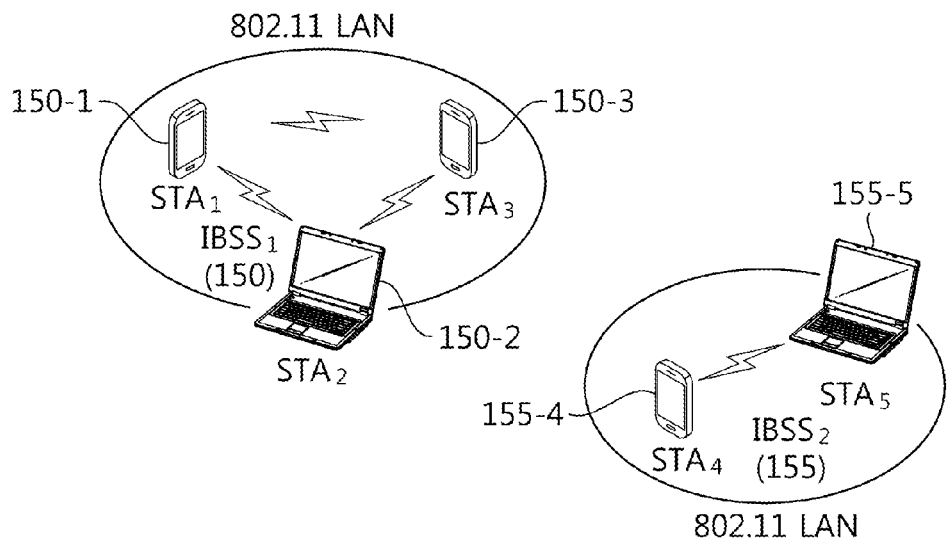
(B)

METHOD AND APPARATUS FOR INITIAL ACCESS OVER WIRELESS LAN

This application is a 35 USC §371 National Stage entry of International Application No. PCT/KR2013/005372 filed on Jun. 18 2013, and claims priority to U.S. Provisional Application No. 61/660,823 filed on Jun. 18, 2012, 61/662,879 filed on Jun. 21, 2012, all of which are hereby incorporated by reference in their entireties as if fully set forth herein.

BACKGROUND OF THE INVENTION

Field of the Invention

The present invention relates to wireless LANs, and more specifically, a method and apparatus that perform initial access over a wireless LAN.

Related Art

Recent wireless LAN technologies are evolving largely in three ways. Efforts to further increase transmission speed include IEEE (Institute of Electrical and Electronic Engineers) 802.11ac and IEEE 802.11ad as extensions to the existing WLAN evolution. IEEE802.11ad is a wireless LAN technique that employs a 60 GH band. Further, broad band wireless LAN utilizing a frequency band of less than 1 GHz is nowadays on the rise to enable transmission in a broader area than by the existing WLAN and such WLAN technologies include IEEE 802.11af utilizing a TVWS (TV White Space) band and IEEE 802.11ah utilizing a 900 MHz band. These standards primarily target expansion of extended range Wi-Fi services as well as smart grid and wide-area sensor networks. Further, the conventional WLAN MAC (Medium Access Control) techniques suffer from the issue that the initial link setup time is significantly increased in some cases. Standardization of IEEE 802.11ai is actively going on to address such issue to thus enable quick access from an STA to an AP.

IEEE 802.11ai is directed to an MAC technique that deals with a rapid authentication procedure to substantially save the initial setup and association time of WLAN and its standardization activities have been started with a normal task group since January 2011. To enable a quick access procedure, the IEEE 802.11ai task group goes on discussion for simplified procedures in the fields of AP discovery, network discovery, TSF (Time Synchronization Function) synchronization, authentication & association, merging with higher layers. Among others, procedure merging utilizing piggyback of DHCP (Dynamic Host Configuration Protocol)), optimization of full EAP (Extensible Authentication Protocol) using concurrent IP, and efficient selective AP (Access Point) scanning are actively under discussion.

SUMMARY OF THE INVENTION

An object of the present invention is to provide an initial access method.

Another object of the present invention is to provide an apparatus that performs an initial access method.

To achieve the above objects of the present invention, according to an aspect of the present invention, an initial access method of an STA (station) may comprise receiving initial access setup information from an AP (Access Point) by the STA and determining whether the STA performs initial access based on the initial access setup information and initial access determination information of the STA, wherein the initial access setup information may be information for determining whether the STA performs the initial access, wherein the initial access setup information may include information on a user priority or an access category, wherein the user priority may be information for indicating an STA that the AP allows to perform the initial access, wherein the access category may be information for indicating the type of traffic data of the STA that the AP allows to perform the initial access, and wherein the initial access determination information may be information on the user priority or the access category corresponding to the STA.

To achieve the above objects of the present invention, according to another aspect of the present invention, an STA (station) of a wireless LAN system includes a processor, wherein the processor may be implemented to receive initial access setup information from an AP (Access Point) by the STA and determine whether the STA performs initial access based on the initial access setup information and initial access determination information of the STA, wherein the initial access setup information may be information for determining whether the STA performs the initial access, wherein the initial access setup information may include user priority information or access category information, wherein the user priority may be information for indicating an STA that the AP allows to perform the initial access, wherein the access category may be information for indicating the type of traffic data of the STA that the AP allows to perform the initial access, and wherein the initial access determination information may be information on the user priority or the access category corresponding to the STA.

When a number of STAs perform initial access to an AP, the STAs performing the initial access may be distributed.

BRIEF DESCRIPTION OF THE DRAWINGS

FIGS. 1(a) and 1(b) are concept views illustrating the structure of a wireless local area network;

DESCRIPTION OF EXEMPLARY EMBODIMENTS

FIG. 1 is a concept view illustrating the structure of a wireless local area network (WLAN).

FIG. 1(A) shows the structure of the IEEE (institute of electrical and electronic engineers) 802.11 infrastructure network.

Referring to FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in FIG. 1(A), a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

FIG. 1(B) is a concept view illustrating an independent BSS.

Referring to FIG. 1(B), the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
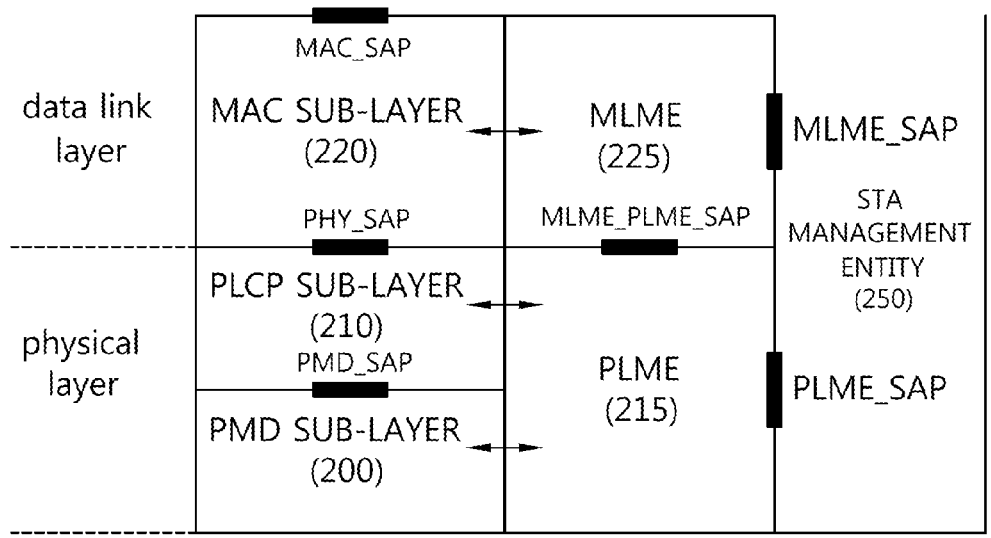
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
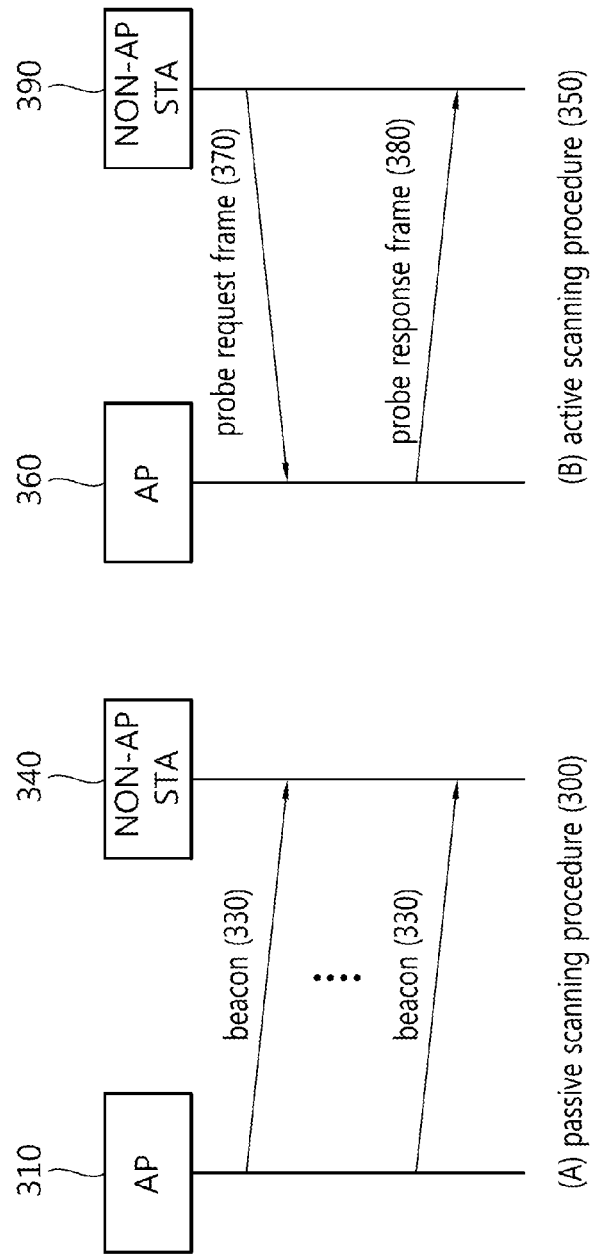
FIGS. 3(a) and 3(b) are concept views illustrating a scanning method in a WLAN.

FIG. 3 is a concept view illustrating a scanning method in a WLAN.

Referring to FIG. 3, the scanning method may be divided into passive scanning 300 and active scanning 350.

Referring to FIG. 3(A), the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot frame format.

Referring to FIG. 3(B), the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
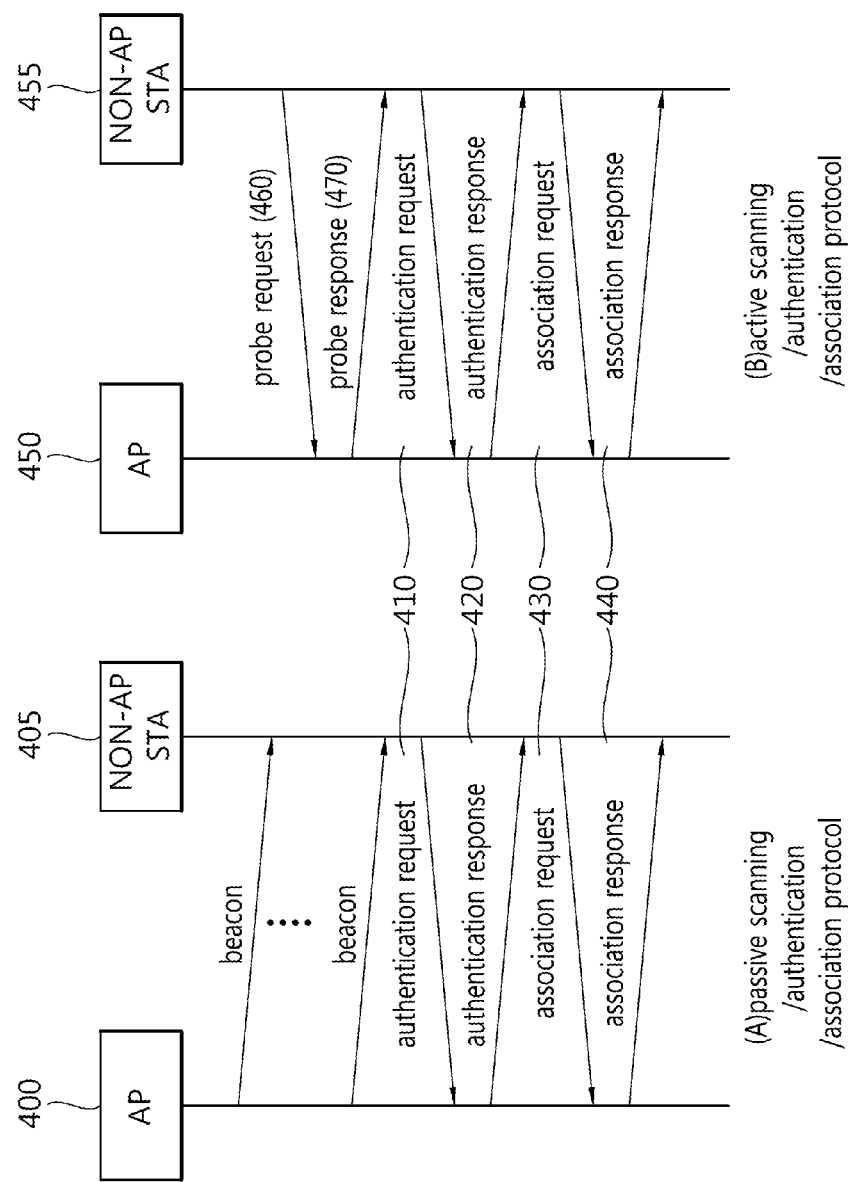
FIGS. 4(a) and 4(b) are concept views illustrating an authentication and association process after scanning between an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. FIG. 4(A) is a concept view illustrating an authentication and association process after passive scanning, and FIG. 4(B) is a concept view illustrating an authentication and association after active scanning.

The authentication and association process may be equally performed by exchanging an authentication request frame 410/authentication response frame 420 and an association request frame 330/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information on the capability of the non-AP STA 405 or 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
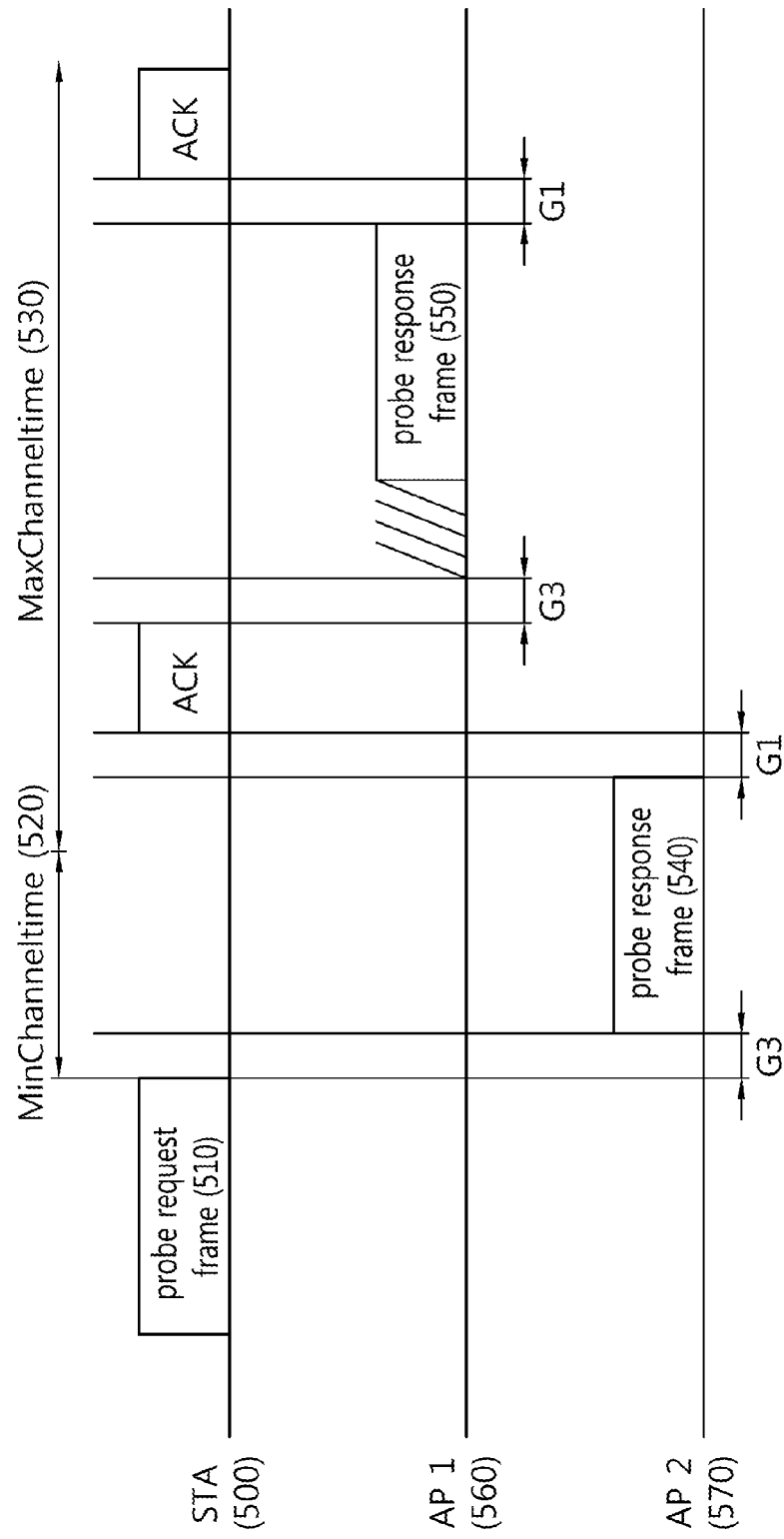
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until the minimum channel time 520, the STA 500 shifts scanning channels to perform scanning on other channel. In case the STA 500 receives the probe response frame 550 until the minimum channel time 520, it may process the received probe response frames 550 and 550 after waiting until the maximum channel time 530.

The STA 500 may detect PHY-CCA.indication primitive until the probe timer reaches the minimum channel time 520 and may determine whether other frame (for example, probe response frames 550 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems-Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
| --- | --- |
| BSSType | Determine whether infrastructure BSS, IBSS MBSS(mesh basic service set), or all are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe request frame during active scanning |
| ChannelList | Specifies a list of channels that are examined when scanning for a BSS |
| MinChannelTime | The minimum time(in TU) to spend on each channel when scanning |
| MaxChannelTime | The maximum time(in TU) to spend on each channel when scanning |
| RequirementInforamtion | This element is optionally present if dot11RadioMeasurementActivated is true and is placed in a probe request frame to |

TABLE 1-continued

| name | description |
| --- | --- |
| | request that the responding STA include the requested information in the probe response frame |
| SSID List | One or more SSID element that are optionally present when dot11MgmtOptionSSIDListActivated is true |
| ChannelUsage | Specifies request types for the ChannelUsage request |
| AccessNetworkType | Specifies a desired specific access networktype or the wild card access network type. This field is present when dot11InterworkingSeviceActivated is true |
| HESSID | Specifies the desired specific HESSID network identifier or the wildcard network identifier. This field is present when dot11InterworkingServiceActivated is true |
| Mesh ID | Only present if BSS Type=MESH or BSSType=ANY_BSS. Specifies the desired Mesh ID or wildcard Mesh ID |
| RequestParameters | The parameter define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added depend on the vendor |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 6:
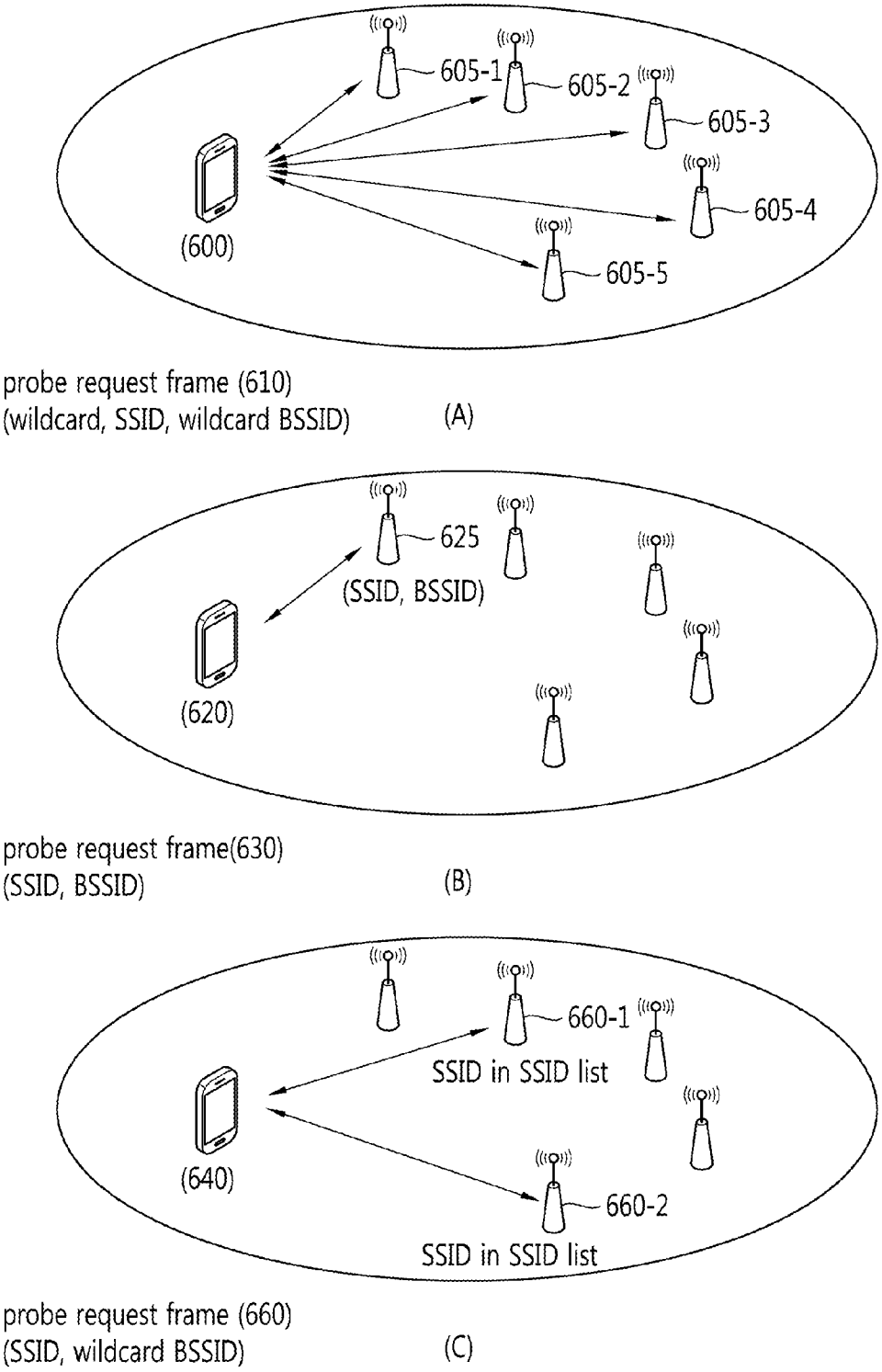
FIGS. 6(a), 6(b) and 6(c) are concept views illustrating a probe request frame transmission method.

FIG. 6 is a concept view illustrating a probe request frame transmission method.

FIG. 6 discloses methods of broadcasting, multicasting, and unicasting probe request frames from an STA.

FIG. 6(A) shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send probe response frames to the STA 600 in response to the received probe request frame.

In case the APs 606-1, 606-2, 606-3, 606-4, and 606-6 that have received the broadcast probe request frame 610 send the probe response frames to the STA 600 in response to the received probe request frame 610 within a predetermined time, the problem may occur that the STA 600 should simultaneously receive and process too many probe response frames.

FIG. 6(B) shows a method in which the STA 620 unicasts the probe request frame 630.

Referring to FIG. 6(B), in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

FIG. 6(C) shows a method in which the STA 640 multicasts the probe request frame 660.

Referring to FIG. 6(C), the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

Hereinafter, the radio access scheme used in 802.11 is disclosed.

Basically, the MAC layer may utilize a DCF (Distributed Coordination Function) as a method for sharing a radio medium by a plurality of STAs. The DCF is based on CSMA/CA (Carrier Sensing Multiple Access with Collision Avoidance). Optionally, the MAC layer defines a method for sharing a medium between STAs based on RTS (Request To Send)/CTS (Clear To Send). The details of the DCF are described below.

Figure 7:
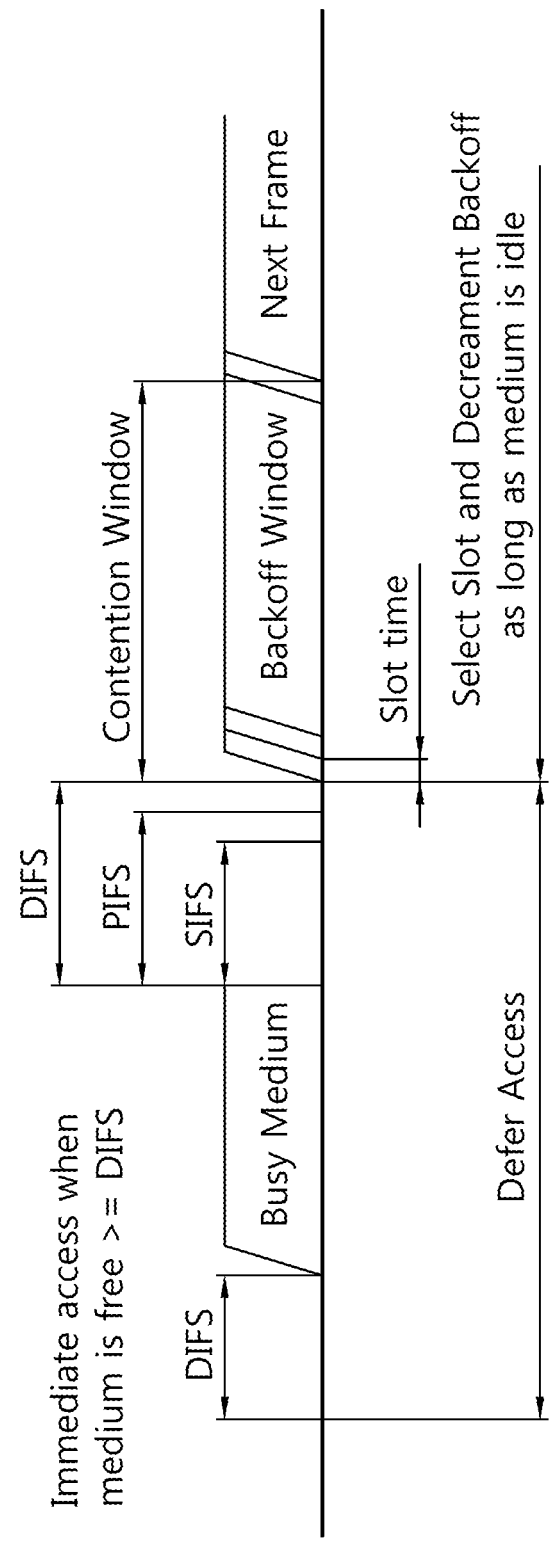
FIG. 7 is a concept view illustrating a DCF access process.

FIG. 7 is a concept view illustrating a DCF access process.

Generally, when an operation is conducted under the DCF access environment, if a medium is not used for a DIFS period or more (i.e., if idle), an STA may transmit an immediate MPDU (MAC Protocol Data Unit). In case the medium is determined to be in use by a carrier sensing mechanism, the STA may determine the size of a CW (Contention Window) by a random backoff algorithm and may perform a backoff procedure. In order to perform the backoff procedure, the STA sets up the CW and selects some time slot. This is called a backoff time. Among others, an STA having the shortest backoff time may access the medium, and the other STAs may stop the remaining backoff time and wait until the transmitting terminal completes the transmission. After the frame transmission of the STA is complete, the other STAs conduct contention over the remaining backoff time to obtain the medium.

In other words, in case the STA gains access to a channel using the DCF, the STA may detect the channel state for a predetermined time. Specifically, the STA, in case the channel remains idle during DIFS( ), attempts transmission after a random backoff time. Such DCF-based transmission scheme plays a role to avoid a plurality of STAs from simultaneously performing transmission, thus preventing collision.

The random backoff time is a time period during which the channel waits before a frame is transmitted after waiting a predetermined time (for example, DIFS), and the random backoff time may be defined as in the following equation:

<Equation 1>

$$\text{Backoff time} = \text{Random}( ) \times \text{SlotTime} \quad (1)$$

Random( )=an integer between 0 and CW
CW is an integer between CWmin and CWmax

Figure 8:
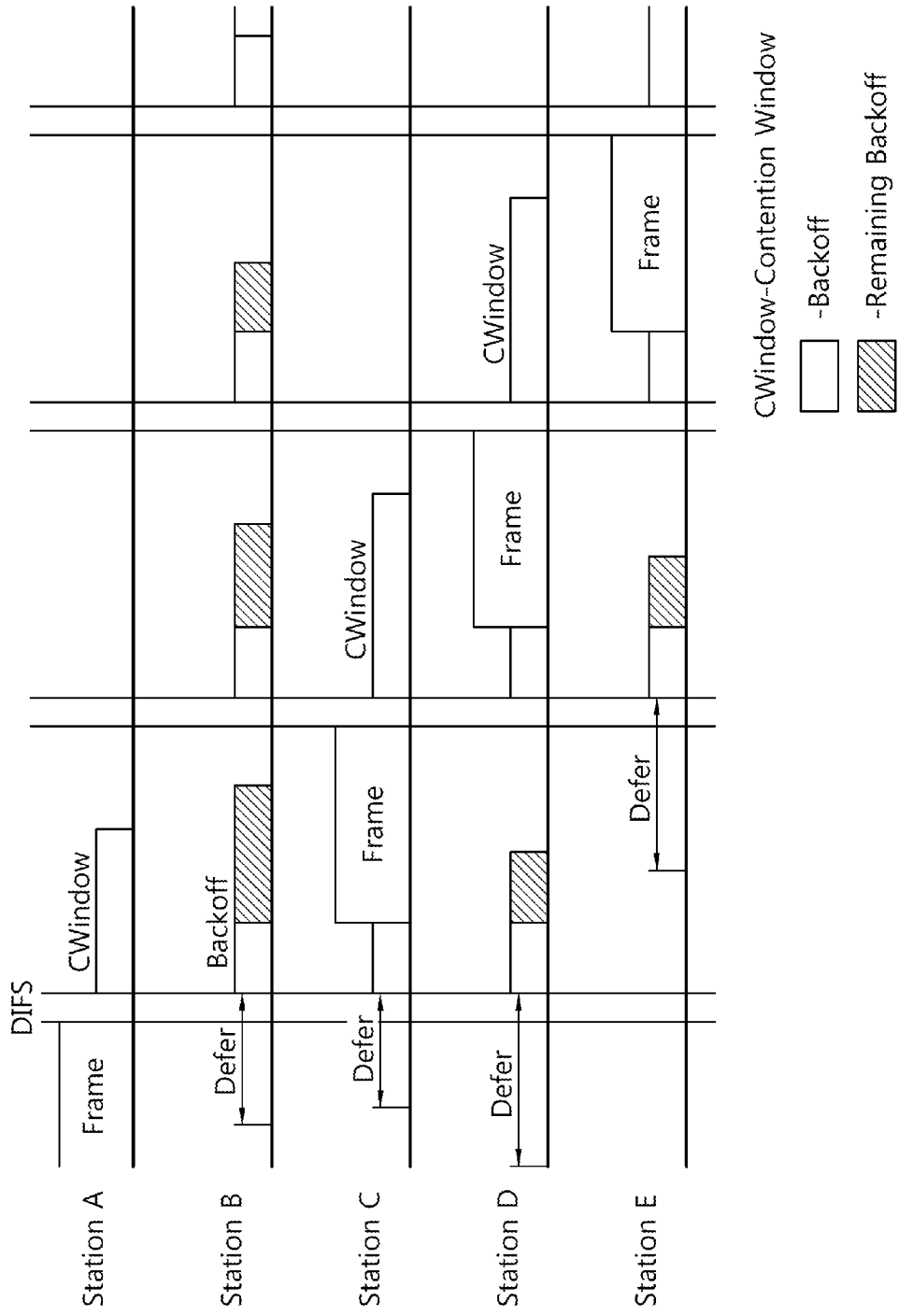
FIG. 8 is a concept view illustrating a backoff procedure of a plurality of STAs.

FIG. 8 is a concept view illustrating a backoff procedure of a plurality of STAs.

Referring to FIG. 8, a backoff slot may occur after a medium is determined to be idle for a DIFS period. If no activity of the medium is detected, the STA may reduce the backoff time based on aSlotTime. In case the medium is determined to be in use for the backoff slot, the STA might not reduce the backoff time. The frame transmission of the STA may be initiated whenever a set backoff timer is 0.

Further, the DCF transmission scheme includes an RTS/CTS access mode in which control frames (RTS, CTS) are exchanged before a data frame is transmitted to pre-occupy a channel. Such scheme may reduce channel waste by replacing a collision that may occur upon transmission of a data frame with a collision by a relatively short control frame.

As another method for sharing a radio medium by a plurality of STAs at the MAC layer, a PCF (Point Coordination Function) may be defined. The above-described DCF is based on the CSMA/CA scheme and is thus not able to guarantee real-time transmission of data transmitted between an STA and an AP. In contrast, the PCF may be used as a method for providing QoS (Quality Of Service) upon real-time data transmission. The PCF, also known as a non-contentious transmission service, may be used alternately with a DCF-type contention-based service, rather than exclusively using the entire medium transmission period. In the PCF, a point coordinator implemented in the AP of the BSS may control the right for each STA to be able to occupy the medium using a polling scheme. The PCF may be given a priority over the DCF by setting the PIFS, which is an IFS (Inter-Frame Space) in the PCF, to be smaller than the DIFS, which is an IFS of the DCF. The IFS denotes an interval between frames, and the IFS may be used to set a priority in which an STA accesses the medium. The IFS may be specifically defined as follows.

Figure 9:
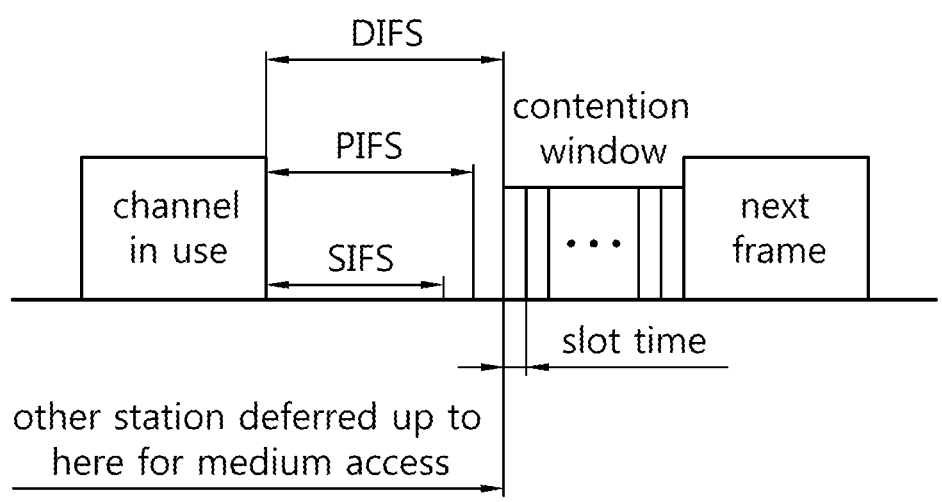
FIG. 9 is a concept view illustrating a frame interval.

FIG. 9 is a concept view illustrating a frame interval.

Referring to FIG. 9, the interval between two frames may be referred to as an IFS. An STA may determine whether a channel is being used for a time period of the IFS as defined in the standards, using a carrier sensing scheme. The MAC layer using the DCF defines a plurality of IFSs. The priority of an STA occupying a radio medium may be determined by an IFS. Inter-frame intervals depending on types of IFSs are as follow:

(1) SIFS (Short Inter Frame Symbol): used upon RTS/CTS, ACK frame transmission. Highest priority
(2) PIFS (PCF IFS): used upon PCF frame transmission
(3) DIFS (DCF FIS): used upon DCF frame transmission
(4) EIFS (Extended IFS): used only when frame transmission error occurs. Not fixed interval In case the DCF is used for a plurality of STAs to share a radio medium at the MAC layer, various problems may arise. For example, when the DCF is used, if a plurality of STAs simultaneously conduct initial access to an AP, collision frequently occurs between the plurality of STAs. Further, the DCF lacks the concept of transmission priority and is not thus able to guarantee QoS (Quality Of Service) for traffic data transmitted from an STA. To address such issues, 802.11e defines a new coordination function, HCF (Hybrid Coordination Function), to enhance the channel access capability of the existing DCF and HCF. The HCF defines two channel access schemes, HCCA (HCF Controlled Channel Access) and EDCA (Enhanced Distributed Channel Access), similar to those defined in 802.11 MAC.

The EDCA and HCCA defines traffic categories that are transmission priorities, and the EDCA and HCCA may determine priorities at which channel access is conducted. In other words, the EDCA and HCCA may determine channel access priorities depending on types of traffic data by mutually defining a CW and an IFS according to the category of traffic data transmitted from an STA.

For example, in case traffic data is an email, the data may be allocated to a low priority class. As another example, in case traffic data is a voice communication through a wireless LAN, channel access may be conducted, with the traffic data allocated to a high priority class.

Upon use of the EDCA, traffic data with a higher priority would have relatively more chance to be transmitted as compared with traffic data with a lower priority. Further, an STA having higher-priority traffic may have a shorter average wait time than an STA having lower-priority traffic before transmitting packets. A transmission priority in the EDCA may be implemented by allocating a shorter CW to higher-priority traffic rather than lower-priority traffic while assigning an AIFS (Arbitration inter-Frame Space) that is shorter than the IFS that is a frame interval defined in the DCF. Further, the EDCA enables an STA to access a channel without contention during a period that is referred to as a TXOP (Transmit Opportunity). An STA may transmit as many packets as possible during a predetermined TXOP period within a range not exceeding the maximum period of the TXOP. If one frame is too long to be transmitted during one TXOP, the frame may be cut into smaller frames that may be then transmitted. Use of the TXOP may mitigate the situation that an STA with a low transmission rate excessively occupies a channel, which is a problem of the existing 802.11 DCF MAC.

Figure 10:
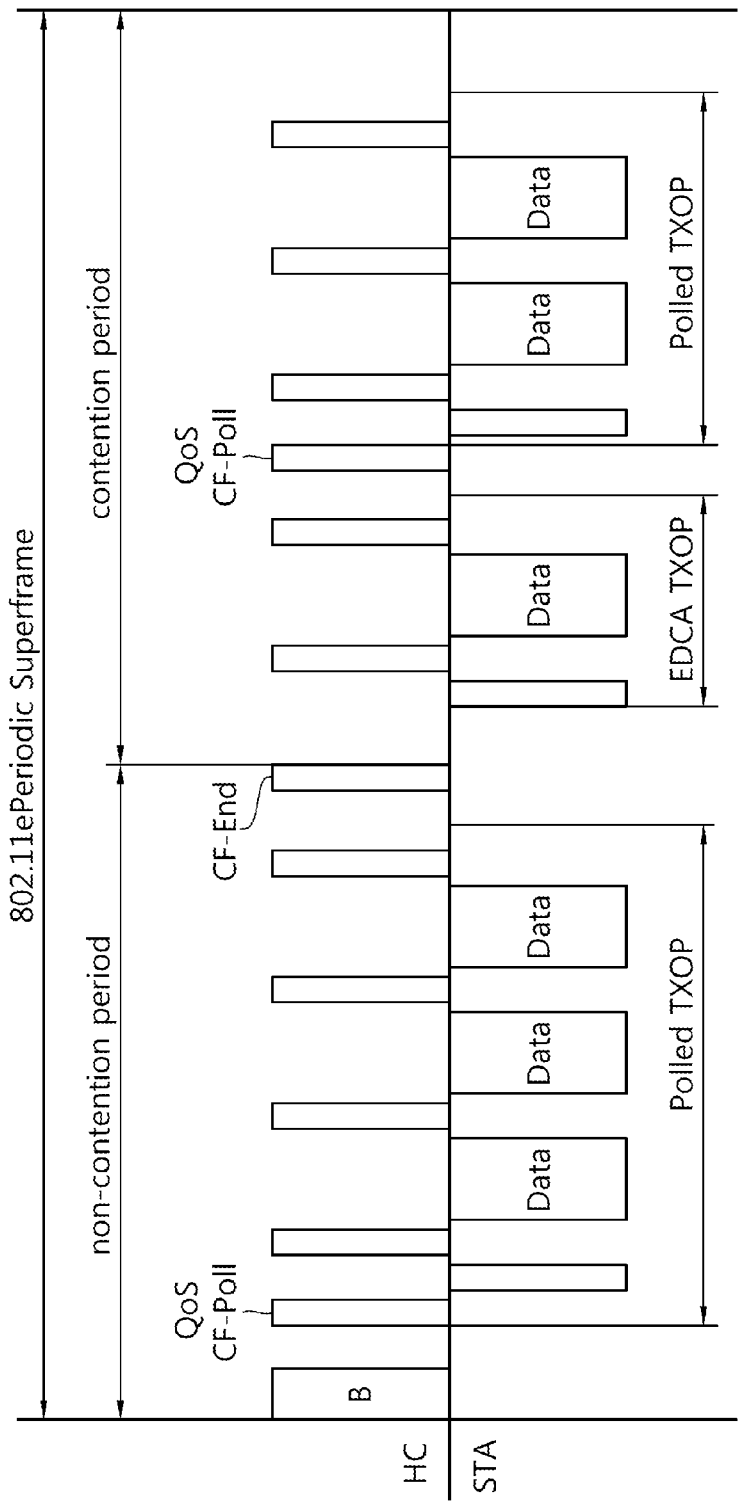
FIG. 10 is a concept view illustrating a method of obtaining a TXOP by an STA.

FIG. 10 is a concept view illustrating a method of obtaining a TXOP by an STA.

Referring to FIG. 10, an STA attending QoS transmission may use two channel access schemes such as EDCA and HCCA to obtain a TXOP by which the STA may transmit traffic for a predetermined traffic. The TXOP may be obtained by succeeding in an EDCA contention or by receiving a QoS CF-Poll frame from an access point. The TXOP obtained by succeeding in an EDCA contention is called an EDCA TXOP, and a TXOP obtained by receiving a QoS CF-Poll frame from an AP is called a Polled TXOP. As such, use of the concept "TXOP" enables an STA to be given a predetermined time during which the STA may transmit a frame or enables the transmission time of the STA to be forcedly constrained. The transmission start time and maximum transmission time of a TXOP may be determined by an AP. The EDCA TXOP may be notified to an STA by a beacon frame, and the Polled TXOP may be notified to an STA by a QoS CF-Poll frame.

The EDCA and HCCA which are channel access schemes defined in the HCF are hereinafter described in greater detail.

(1) EDCA

In the EDCA scheme, channel access may be conducted with eight user priorities defined for traffic data. For priority-based QoS data frame transmission, the EDCA defines four ACs (Access Categories: AC_BK, AC_BE, AC_VI, and AC_VO). The EDCA may, based on the ACs, map the traffic data arriving at the MAC layer with different user priorities as in the following <Table 2>.

Table 2 exemplifies the mapping between the user priorities and the ACs.

TABLE 2

| Priority | User Priority | AC(access category) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

A transmission queue and an AC parameter may be defined for each AC. The differences in transmission priority between the ACs may be implemented based on the AC parameter values set to be different from each other. The EDCA may use AIFS[AC], CWmin[AC], and CWmax[AC] instead of DIFS, CWmin, and CWmax, respectively, which are parameters used in the DCF in the backoff procedure for transmitting the frames belonging to the AC. The parameters used in the backoff procedure for each AC may be carried over a beacon frame from an AP to each STA. As AIFS[AC] and CWmin[AC] decrease, a higher priority is given, and accordingly, the channel access delay shortens, thus allowing for use of more bands in a given traffic environment.

In case a collision occurs between the STAs while the STA transmits a frame, an EDCA backoff procedure of generating a new backoff counter is similar to the existing DCF backoff procedure, and differentiated backoff procedures for each AC may be performed based on different EDCA parameters. The EDCA parameters is becoming a critical means to differentiate channel access of various user priorities of traffic. A proper configuration of the EDCA parameter value including per-AC parameters may increase the transmission effect according to the priority of traffic while optimizing the network performance. Accordingly, an AP should conduct the overall management and adjustment function for the EDCA parameters to ensure that all of the STA attending the network may evenly access the medium.

Figure 11:
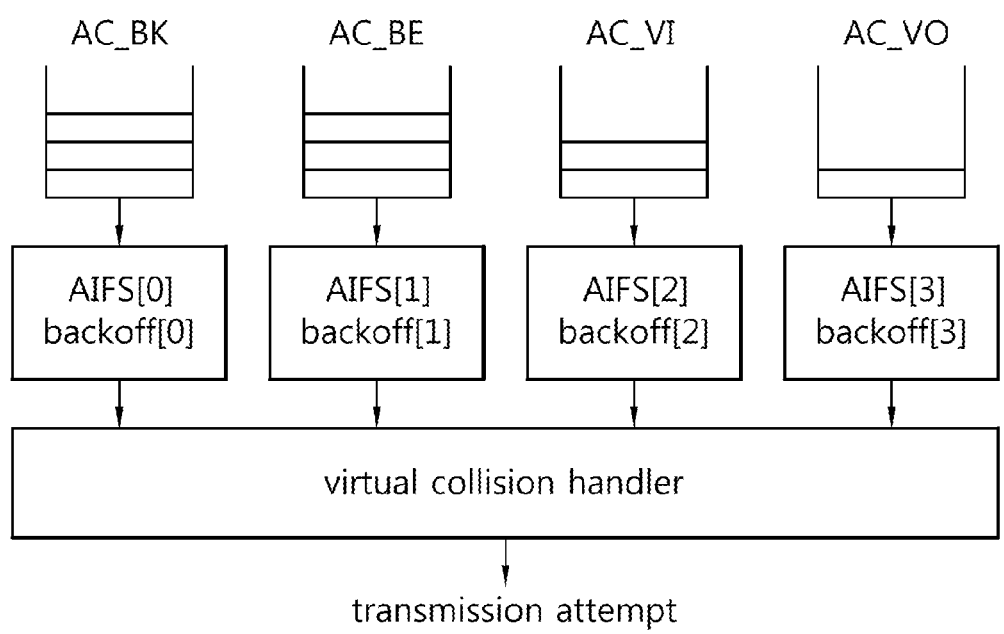
FIG. 11 is a concept view illustrating an EDCA channel reference model.

FIG. 11 is a concept view illustrating an EDCA channel reference model.

Referring to FIG. 11, the transmission queue for each of the four ACs defined in 802.11e MAC may play a role as an individual EDCA contention entity for radio medium access in one STA. One AC may retain an independent backoff counter with its own AIFS value. If there are one or more ACs that have simultaneously finished backoff, the collision between the ACs may be adjusted by a virtual collision handler. A frame is first transmitted to an AC having the highest priority, and the other ACs renew their backoff counters by increasing the contentious window values.

The start of a TXOP occurs upon accessing a channel according to the EDCA rules. If obtaining an EDCA TXOP when two or more frames stack in one AC, the EDCA MAC may attempt to transmit a number of frames. If an STA has already sent one frame and the STA may transmit a next frame in the same AC within the remaining TXOP time and receive an ACK thereto, the STA attempts transmission of the frame after an SIFS time interval. A TXOP constraint value may be transferred from the AP to the STA. In case the size of a data frame to be transmitted is in excess of the TXOP constraint value, the STA may fragment the frame into a number of smaller frames, and the STA may transmit the smaller frames within a range not exceeding the TXOP constraint value.

Figure 12:
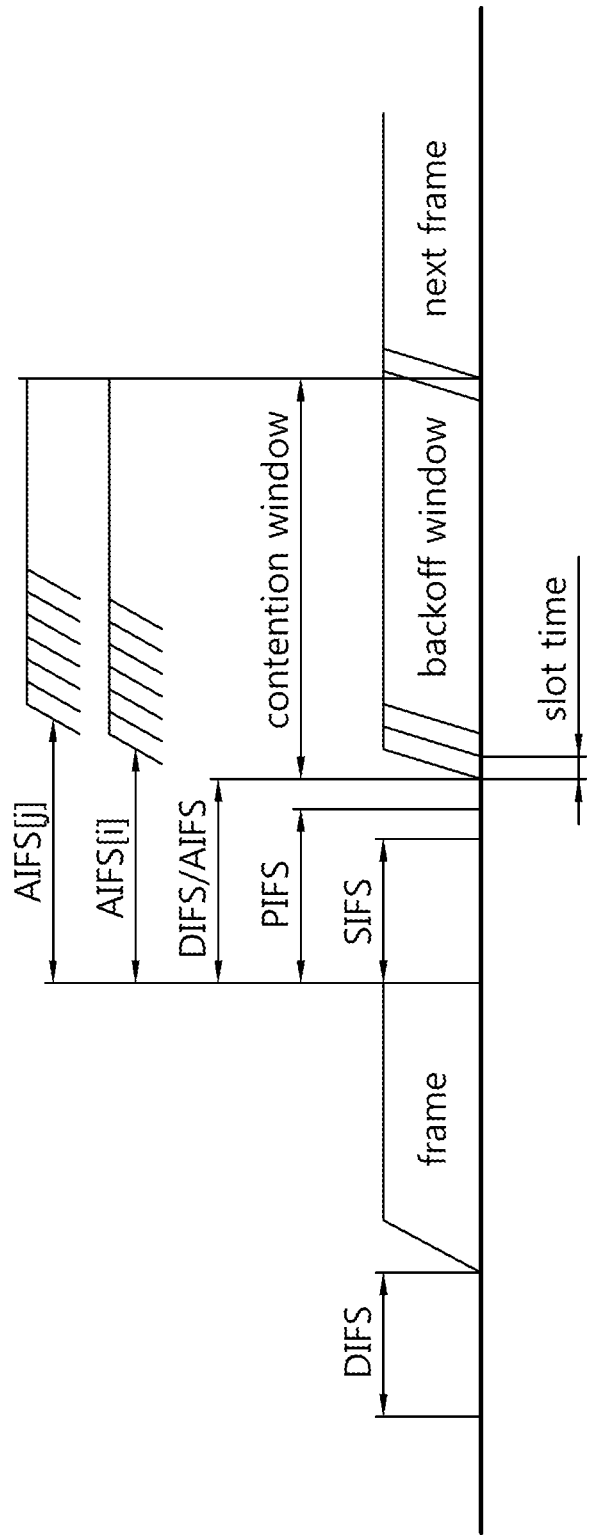
FIG. 12 is a concept view illustrating a backoff procedure of an EDCA.

FIG. 12 is a concept view illustrating a backoff procedure of an EDCA.

Referring to FIG. 12, each traffic data transmitted from an STA has a priority, and a backoff procedure may be conducted based on a contentious EDCA scheme. For example, the priorities respectively assigned to the traffics, as set forth above in Table 2, may be separated into eight, for example. As described above, one STA has different output queues depending on priorities, and each output queue is operated according to the EDCA rules. Each output queue may transmit traffic data using different AIFSs (Arbitration Interframe Spaces) according to each priority instead of the conventionally used DIFSs (DCF Interframe Spaces). Further, in case STAs are supposed to transmit traffics having different priorities at the same time, a traffic having a higher priority is transmitted earlier than the others, preventing collision in the terminal.

A backoff occurs under the following situations. A backoff is used when the frames transmitted from terminals cause collision and thus re-transmission is needed. To initiate a backoff, a terminal sets any backoff time in its backoff timer using Equation 2 below:

$$T_b[i]=\text{Random}(i) \times \text{SlotTime} \qquad \text{<Equation 2>}$$

Here, Random(i) is a function that generates any integer between 0 and CW[i] using a uniform distribution. CW[i] is a contention window between the minimum contention window CWmin[i] and the maximum contention window CWmax[i], and i is a traffic priority. At every collision, a new contention window CWnew[i] is computed using the following Equation 3 including a previous window CWold[i]:

$$CW_{new}[i]=((CW_{old}[i]+1) \times PF)-1 \qquad \text{<Equation 3>}$$

Here, PF is computed according to the procedure defined in the IEEE 802.11e standard. CWmin[i], AIFS[i], and PF value may be transmitted from the AP using a QoS parameter set element that is a management frame.

(2) HCCA

The HCCA protocol uses an HC (Hyper Coordinator) that is positioned in an AP for centralized management on radio medium access. Since the HC performs integrated and centralized management on the radio medium, contention over radio medium access between STAs may be reduced, and exchange between data frames may be left in a short transmission delay time (SIFS), thus increasing network efficiency.

The HC controls transmission delay and scheduling by defining, in a parameter, a QoS characteristic for a particular traffic required by an application service to support QoS. Prior to the transmission of the parameterized QoS traffic, the HC establishes a virtual connection that is referred to as a traffic stream. The traffic stream may correspond to each of uplink from STA to AP, downlink from AP to STA, or direct link from STA to STA. In order to configure a traffic stream between an AP and an STA, QoS demand parameters such as delay time and traffic characteristics such as frame size and average transmission speed are exchanged through a mutual negotiation process.

In case the HC transmits a QoS CF-Poll frame to an STA, a TXOP constraint value that is a service provision time allowed to the STA is included in the QoS control field. In other words, the HC controls allocation of a medium access time using the TXOP. The TXOP constraint value is determined by a TSPEC. The TSPEC is requested by a station, and an AP determines whether to accept or decline the request for the TSPEC depending on network circumstances.

Once a traffic stream is configured, the HC provides contracted QoS by allocating a radio band required for the configured traffic stream between the AP and the STA. At a non-contention period of the HCCA, the HC has a right to control the medium, and if required, even at a contention period, the HC obtains a right to control the medium by transmitting a QoS CF-Poll frame after as long a delay time as the PIFS.

Figure 13:
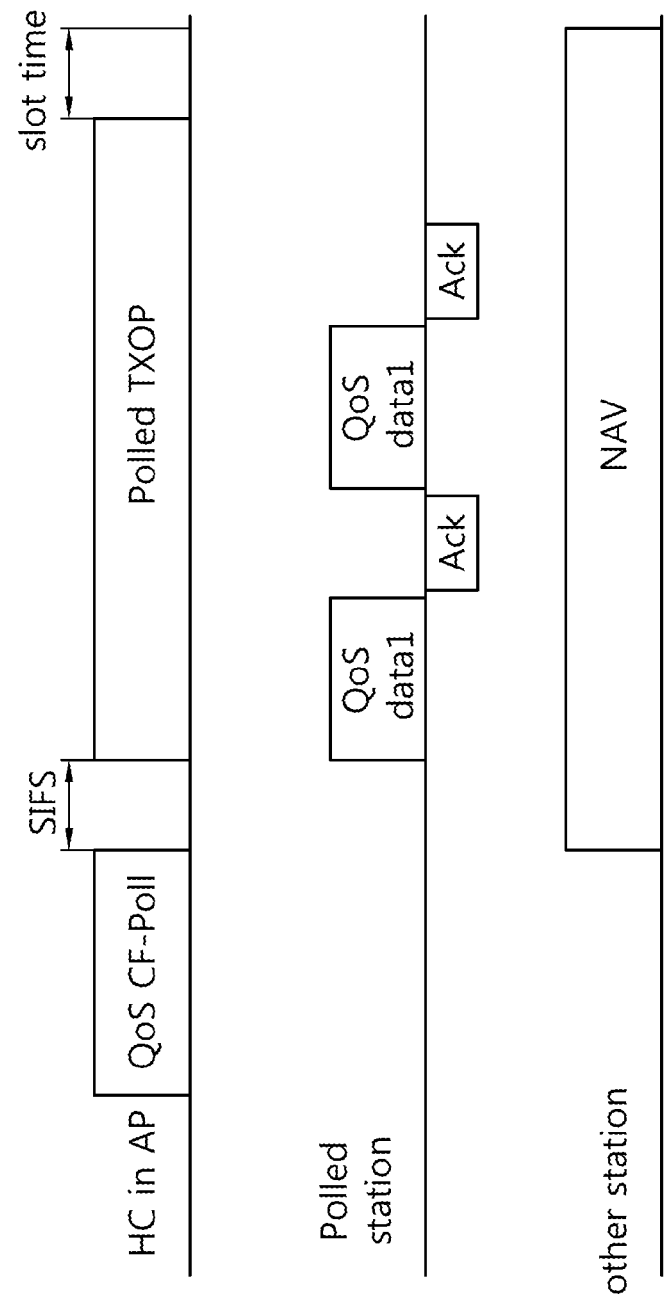
FIG. 13 is a concept view illustrating polled TXOP timings.

FIG. 13 is a concept view illustrating polled TXOP timings.

Referring to FIG. 13, a polled STA possessing a TXOP receives a QoS CF-Poll frame to have a right for channel access for as long a time as the TXOP constraint value designated in the QoS CF-Poll frame, and the polled STA transmits several frames. In this case, other STAs also configure their own NAVs by summing the TXOP time and a predetermined time after the reception of the QoS CF-Poll frame that does not apply to the STAs, and for the time, the STAs do not conduct contention over channel access.

Resultantly, the HC needs to schedule proper transmission of a QoS CF-Poll frame to satisfy contracted QoS requirements. Since a radio medium has various channel conditions depending on times and locations, creating an efficient scheduling algorithm is critical in supporting QoS. An excellent scheduling algorithm may enhance the capability of a radio network by allowing for more traffic streams without violating the QoS contract.

Hereinafter, a method of distributing a number of terminals to perform initial access when the terminals conduct initial access to an AP according to an embodiment of the present invention is disclosed. For example, there may be a number of APs that intend to access a particular AP in a subway station, concert or train station. In case an existing initial access method is used, the frames to perform an initial access procedure, such as a beacon frame, probe request frame, probe response frame, authentication request frame, association request frame, and association response frame, have the same access category (AC), AC_VO. Accordingly, in such case, even when performing an EDCA procedure, all the terminals conduct initial access based on the same priority, and thus, distribution of the terminals are not achieved when the initial access is performed.

To address such issue, a method in which an AP bars access from a terminal attempting initial access is now described. According to the present invention, the AP may transmit information on an available initial link setup to bar the terminal from initial access to the STA to distribute the access load of the initial link setup. A load that may be generated when multiple STAs simultaneously perform initial access to the AP may be distributed by using such method.

Figure 14:
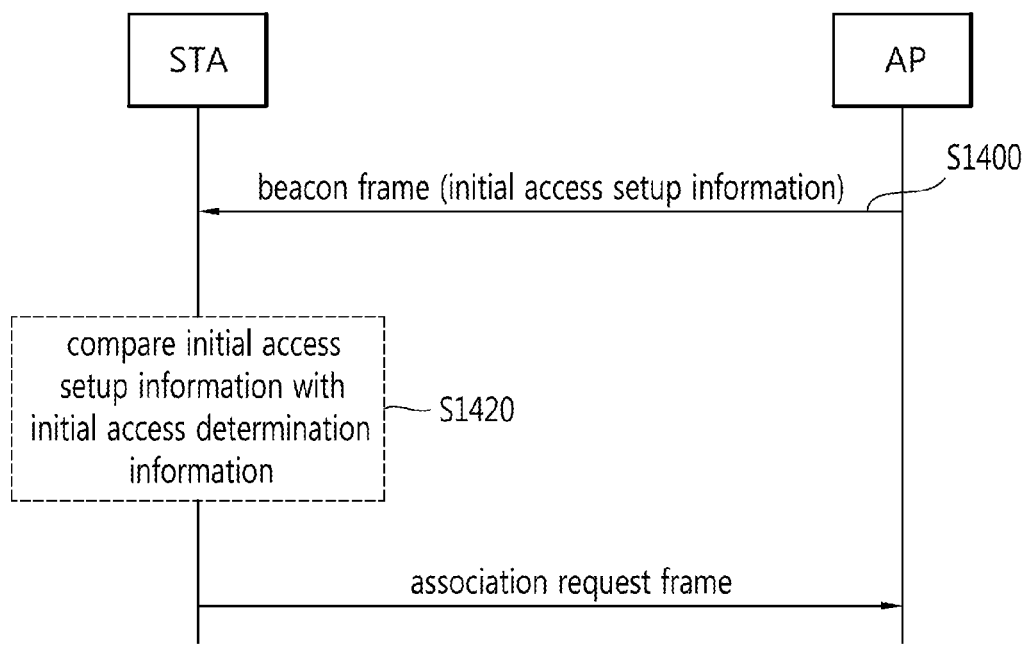
FIG. 14 is a concept view illustrating an initial access constraining method according to an embodiment of the present invention.

FIG. 14 is a concept view illustrating an initial access constraining method according to an embodiment of the present invention.

Referring to FIG. 14, an AP may transmit, to an STA, information for barring access from an STA attempting initial access based on a beacon frame or probe response frame (step S1400).

Hereinafter, according to an embodiment of the present invention, the information to allow an AP to determine a method in which an STA attempting initial access performs initial access is hereinafter defined as initial access setup (or configuration) information. The access setup information is information for constraining an STA conducting initial access, and the access setup information may be included in a management frame (e.g., a beacon frame or probe response frame) transmitted from the AP to the STA to perform initial access. The initial access setup information is described below in greater detail.

When receiving the initial access setup information, the STA determines an initial access method by comparing the initial access determination information of the STA with the received initial access setup information (step S1420).

The initial access setup information transmitted from the AP to the STA may contain, e.g., information for determining the STA's initial access based on user priority information or access class information. The STA may determine whether the STA is allowed for initial access to the AP based on the user priority information and access class information contained in the initial access setup information. As compared with the AP's initial access setup information, the information for the STA to determine whether the initial access is possible may be determined as initial access determination information.

For example, the STA may configure the initial access determination information based on the category information on traffic data to be transmitted. The STA performing initial access to transmit particular data to the AP may be aware of only category information on the traffic data to be transmitted, and the STA may configure the initial access determination information based on the category information. As a specific example, assume that the traffic data to be transmitted from the STA to the AP is voice data and thus the AC of the data is AC_VO. In such case, the STA may determine an initial access method for the traffic data corresponding AC_VO by making a comparison with the initial access setup information transmitted from the AP.

In case the STA compares the initial access setup information transmitted from the AP with the initial access determination information and the two match each other, the STA may perform an initial access procedure. In contrast, unless the comparison between the initial access setup information transmitted from the STA to the AP and the STA's initial access determination information shows the two match each other, the STA does not perform an initial access procedure or may perform initial access after a predetermined initial access barring period. Or, if the two do not match each other, the STA may perform an operation of, e.g. performing scanning on other AP. For example, in case the STA does not perform an initial access procedure, the STA's initial access to the AP may be barred until the initial access setup information re-transmitted from the AP matches the STA's initial access determination information. Such method is described below in further detail.

The above-described initial access setup information transmitted from an AP is now disclosed.

The initial access setup information transmitted from an AP to an STA to bar the STA from initial access may be information of a bitsequence format or bitmask format including a plurality of bits. The bitmask or bitsequence is an example of the information format for transmitting the initial access setup information configured by the AP to the STA. In other words, according to an embodiment of the present invention, the AP may use various other information formats than the bitmask or bitsequence, or other bitmap or bitmask bitsequence format to transmit available initial access setup information. Hereinafter, according to an embodiment of the present invention, a bitsequence-based method is described for ease of description, for example.

The following Table 3 represents a bitsequence including information on initial link setup.

TABLE 3

| Bit (s) | Available Initial Link Setup Capacity Reported |
|---------|------------------------------------------------|
| 0       | UP 0                                           |
| 1       | UP 1                                           |
| 2       | UP 2                                           |
| 3       | UP 3                                           |
| 4       | UP 4                                           |
| 5       | UP 5                                           |
| 6       | UP 6                                           |
| 7       | UP 7                                           |
| 8       | AC 0                                           |
| 9       | AC 1                                           |
| 10      | AC 2                                           |
| 11      | AC 3                                           |
| 12~15   | Reserved                                       |

Referring to Table 3, a UP (User Priority) and an AC (Access Class) may be defined depending on the traffic type of data to be transmitted from an STA. The traffic type of data to be transmitted from an STA may be the type of data to be transmitted and received between the STA and an AP after the STA performs association with the AP.

For example, the STA may perform initial access in case a bit of the initial access setup information corresponding to the STA's initial access determination information is '1' based on the received bitsequence information.

The AP may indicate an STA that may conduct initial access based on the bitsequence. For example, assume that a particular bit included in the bitsequence is set to '1.' Such case may indicate that the STA having the initial access determination information corresponding to the initial access setup information corresponding to the bit set to '1' may conduct initial access. In contrast, it may be assumed that the particular bit included in the bitsequence is set to '0.' This case may indicate that the STA having the initial access determination information corresponding to the initial access setup information corresponding to the bit set to '0' might not perform initial access. Further, the case may also indicate that the STA having the initial access determination information corresponding to the initial access setup information corresponding to the bit set to '0' is to proceed with initial access after a predetermined delay period or that initial access to other AP is carried out.

Or, such case may be represented as the STA's initial access determination information matching the initial access setup information transmitted from the AP, and the STA where the initial access determination information matches the initial access setup information may be referred to as a matching STA. For example, assume that a bit of the bitsequence corresponding to AC_VO in the initial access setup information transmitted from the AP is set to '1.' In such case, if the STA's initial access determination information is AC_VO, the initial access determination information may be said to match the initial access setup information. A time period during which the matching STA performs initial access may be referred to as a matching STA access period.

In contrast, in case a bit of the initial access setup information corresponding to the STA's initial access determination information is set to '0,' the STA does not conduct initial access or the STA may perform initial access after a predetermined delay period. Such STA may be referred to as a non-matching STA. An access period of a non-matching STA where the access is performed after a predetermined delay period may be referred to as a non-matching STA access period.

In other words, the STA may determine an initial access method based on the UP and/or AC information included in the initial link setup information transmitted from the AP. The bitsequence base station used as the initial link setup information is 16-bit information as shown in Table 3. The bits (0 to 7) corresponding to some indexes may be used for indexing the UP that may perform initial transmission, and the bits (8 to 11) corresponding to other indexes may be used for indexing the AC that may perform initial transmission. Such bitsequence is merely an example, and a bitsequence using only the AC as the initial link setup information and a bitsequence using only the UP as the initial link setup information may also be used for determining the STA's initial access. As shown in Table 3, the number of bits used for transmitting the initial access setup information and the categories classified according to the bits are arbitrary.

The AP may transmit frames (for example, a beacon frame, FILS beacon frame, probe response frame, and/or unsolicited probe response frame) containing the initial access setup information to the STA. The unsolicited probe response frame indicates a probe response frame transmitted from the AP to the terminal in a broadcasting manner.

Figure 15:
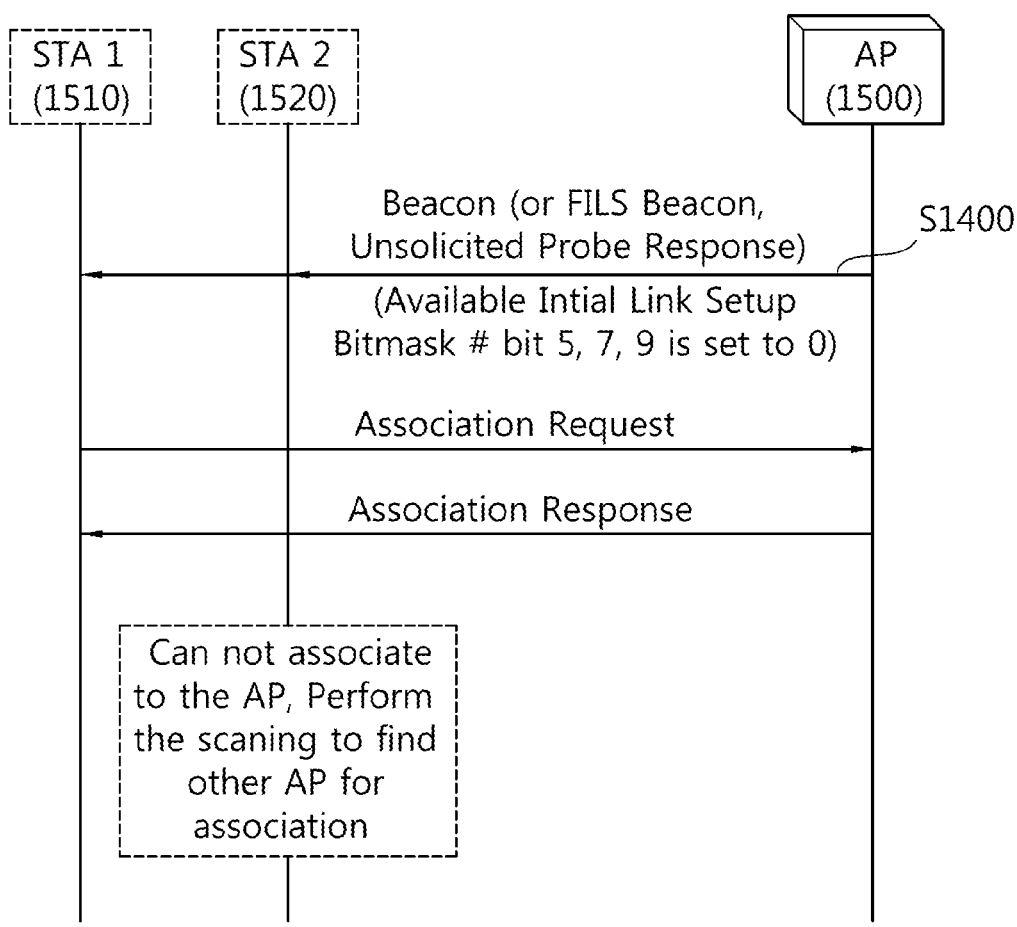
FIG. 15 is a concept view illustrating an initial access method according to an embodiment of the present invention.

FIG. 15 is a concept view illustrating an initial access method according to an embodiment of the present invention.

FIG. 15 shows the concept of the operations of a matching STA and a non-matching STA in case an AP transmits initial access setup information based on a bitsequence.

Referring to FIG. 15, the AP 1500 may transmit a frame for performing initial access (for example, a beacon frame, FILS beacon frame, probe response frame or unsolicited probe response frame). The frame for performing initial access may contain initial access setup information. It is assumed in FIG. 15 that in the bitsequence described above in connection with Table 3, the bits corresponding to indexes #5, #7, and #9 are set to '0' and the indexes of the remainder of the bitsequence are set to '1.'

The first STA 1510 may be an STA whose initial access determination information does not correspond to indexes #5, #7, and #9 of the bitsequence. In other words, the first STA 1510 may be a matching STA that may perform initial access. In contrast, the second STA 1520 may be an STA whose initial access determination information corresponds to indexes #5, #7, and #9 of the bitsequence. In other words, the second STA 1520 may be a non-matching STA that cannot perform initial access or that performs initial access after a predetermined delay period.

Since the first STA 1510 is a matching STA whose initial access determination information matches the initial access setup information transmitted from the AP 1500, the first STA 1510 may transmit an association request frame to the AP 1500 to perform an initial access procedure with the AP 1500. In contrast, since the initial access determination information of the second STA 1520 does not match the initial access setup information transmitted from the AP 1500, the second STA 1520 cannot perform initial access, performs initial access after a predetermined delay period, or may perform an operation such as conducting scanning on other AP.

Figure 16:
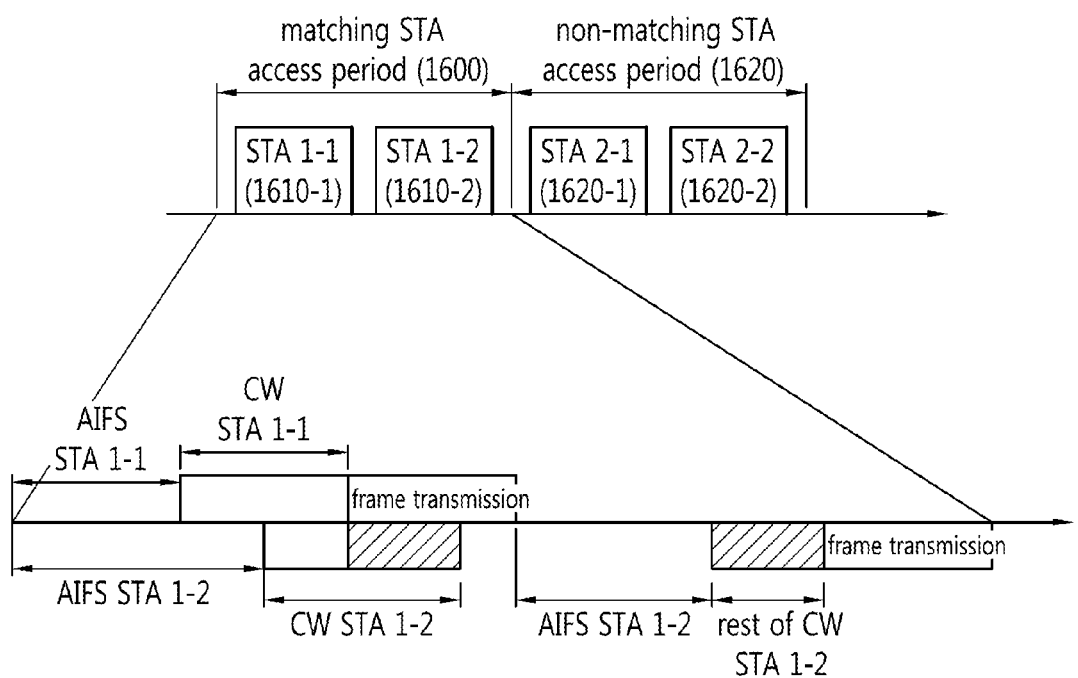
FIG. 16 is a concept view illustrating an initial access method according to an embodiment of the present invention.

FIG. 16 is a concept view illustrating an initial access method according to an embodiment of the present invention.

As shown in FIG. 16, a 1-1th s 1610-1 and a 1-2th STA 1610-2 may indicate matching STAs whose initial link determination information matches the initial link setup information transmitted from an AP. In contrast, a 2-1th STA 1610-1 and a 2-2th STA 1620-2 may indicate non-matching STAs whose initial link determination information does not match the initial link setup information transmitted from the AP. FIG. 16 discloses an initial access method by the 1-1th STA 1610-1, the 1-2th STA 1610-2, the 2-1th STA 1620-1, and the 2-2th STA 1620-1.

The AP may transmit a frame (e.g., a beacon frame) containing initial link setup information to the STAs (the 1-1th STA, the 1-2th STA, the 2-1th STA, and the 2-2th STA).

When receiving the beacon frame, the STAs (the 1-1th STA, the 1-2th STA, the 2-1th STA, and the 2-2th STA) may determine whether they are non-matching STAs or matching STAs that may perform initial access based on their respective initial link determination information.

The matching STAs (the 1-1th STA 1610-1 and the 1-2th STA 1610-2) may perform initial access within access periods of the matching STAs. The access period of a matching STA may be a period during which the matching STA has priority in channel access, rather than a period separately defined. The matching STAs, i.e., the 1-1th STA 1610-1 and the 1-2th STA 1610-2, may sequentially perform an association procedure with the AP through the above-described existing EDCA or DCF-based channel access method. According to an embodiment of the present invention, when STAs perform initial access, matching STAs only are allowed to gain access or matching STAs are given priority in gaining access, enabling the initial access of the STAs to be further distributed as compared with when initial access to the AP is conducted through an EDCA or DCF-based channel access method.

The initial access of non-matching STAs may be constrained by various methods. For example, the non-matching STAs may be barred from initial access until a frame including initial access setup information matching the initial access determination information of the non-matching STAs is transmitted. In another embodiment, the AP may transmit, to the STAs, information on an initial access barring period in addition to the initial access setup information. The non-matching STAs may perform initial access to the AP within a non-matching STA access period 1620 that is a time period after the initial access barring period elapses, based on the information on the initial access barring period. As another method, no non-matching STAs may be allowed for channel access.

The following Tables 4 and 5 represent methods of transmitting information on an initial access barring period from an AP to an STA.

TABLE 4

| Information | Note |
|---|---|
| Available Initial Link Setup Capacity Bitmask | Indicate whether terminal's access to AP per Access Class is possible<br>0: STA is not allowed to access the AP<br>1: STA is allowed to access the AP |
| For (i=0; I > Number of negative bitmask; i++){ | No of ACs and UPs not allowed to access |
| Access barring period | Time during which terminal is barred from access to AP<br>Representable in micro-seconds |
| } | |

TABLE 5

| Information | Note |
|---|---|
| Available Initial Link Setup Capacity Bitmask | Indicate whether terminal's access to AP per Access Class is possible<br>0: STA is not allowed to access the AP<br>1: STA is allowed to access the AP |
| For (i=0; i > Number of positive bitmask; i++){ | No of ACs and UPs allowed to access |
| Access allowable period | Time during which terminal is allowed to access AP<br>Representable in micro-seconds |
| } | |

Referring to Tables 4 and 5, access barring periods and access allowable periods may be defined depending on initial setup information. The AP may transmit, to the STA, information on a period during which a non-matching STA may perform initial access. The non-matching STA may conduct initial access based on the information on the initial access period received from the AP.

The information on the access barring period or access allowable period may be determined by various methods. For example, the access barring period may be determined based on information transmitted from a terminal and/or information generated from the AP. Such information may be referred to as access period determination information. The access period determination information may be determined based on, e.g., 1) the terminal's AC (Access Class) or UP (User Priority) information, 2) backoff retry count, 3) packet retransmission count, 4) latest backoff interval, 5) BSS average access delay, 6) per-AC access delay or at least one thereof. The information corresponding to 1) to 4) above may be information reported from the STA to the AP through a frame for performing initial access such as a probe request frame or association request frame. The information corresponding to 5) and 6) above may be information measured by the AP itself. The AP may estimate information on the load of the BSS based on the access period determination information, and the AP may determine the access barring period or access allowable period based on the estimated information.

Figure 17:
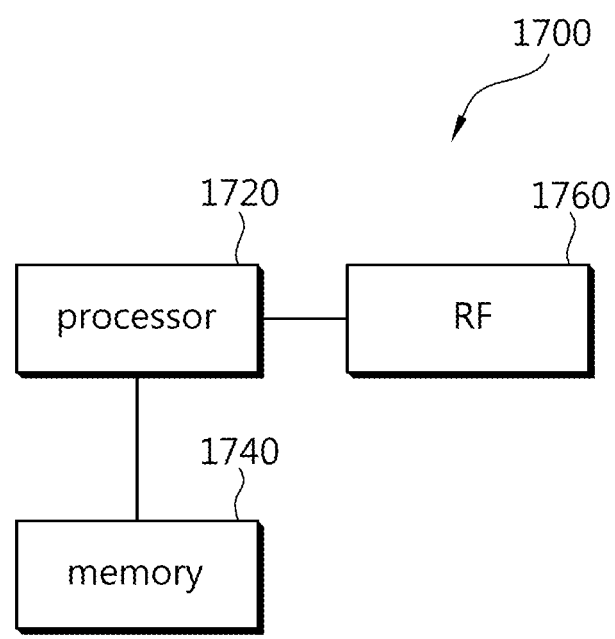
FIG. 17 is a block diagram illustrating a wireless device to which an embodiment of the present invention may apply.

FIG. 17 is a block diagram illustrating a wireless device to which an embodiment of the present invention may apply.

Referring to FIG. 17, the wireless device 1700 may be an STA that may implement the above-described embodiments, and the wireless device 1700 may be an AP or a non-AP STA (station).

The wireless device 1700 includes a processor 1720, a memory 1740, and an RF (Radio Frequency) unit 1760.

The RF unit 1760 may be connected with the processor 1720 to transmit/receive radio signals.

The processor 1720 implements functions, processes, and/or methods as proposed herein. For example, the processor 1720 may be implemented to perform the operation of the above-described wireless device according to an embodiment of the present invention.

For example, the processor 1720, in case the wireless device is an AP, may be implemented so that the AP generates initial access setup (or configuration) information for determining initial access from an STA and the AP transmits the generated initial access setup information to the STA.

Further, the processor 1720, in case the wireless device is an STA, may be implemented to enable the STA to receive initial access setup information from an AP and to determine whether the STA performs initial access depending on whether the initial access setup information matches the initial access determination information of the STA, based on the initial access setup information and the initial access determination information of the STA.

The processor 1720 may include an ASIC (Application-Specific Integrated Circuit), other chipset, a logic circuit, a data processing device, and/or a converter that performs conversion between a baseband signal and a radio signal. The memory 1740 may include a ROM (Read-Only Memory), a RAM (Random Access Memory), a flash memory, a memory card, a storage medium, and/or other storage device. The RF unit 1760 may include one or more antennas that transmit and/or receive radio signals.

When an embodiment is implemented in software, the above-described schemes may be embodied in modules (processes, or functions, etc.) performing the above-described functions. The modules may be stored in the memory 1740 and may be executed by the processor 1720. The memory 1740 may be positioned in or outside the processor 1720 and may be connected with the processor 1720 via various well-known means.

What is claimed is:

1. An initial access method of a first station (STA), the method comprising:
    receiving, by the first STA, initial access setup information from an access point (AP), wherein the initial access setup information includes a bit sequence including a first bit and a second bit;
    determining, by the first STA, whether the first STA performs an initial access based on the initial access setup information and initial access determination information of the first STA, wherein the first bit of the bit sequence included in the initial access setup information corresponding to the initial access determination information of the first STA indicates that the first STA is not allowed to access the AP, wherein the second bit of the bit sequence included in the initial access setup information corresponding to initial access determination information of a second STA indicates that the second STA is allowed to access the AP;
    obtaining, by the first STA, an initial access barring period corresponding to a value of the first bit; and
    performing, by the first STA, the initial access within a determined period after the initial access barring period elapses, wherein the second STA performs the initial access before the determined period,
    wherein the initial access setup information is information for determining whether the first STA or the second STA perform the initial access,
    wherein the initial access setup information includes information on a user priority and an access category,
    wherein the user priority and the access category are information for indicating the type of traffic data of the first STA and the second STA, and
    wherein the initial access determination information of the first STA is information on the user priority and the access category corresponding to the first STA.

2. The method of claim 1,
    wherein the initial access barring period is determined based on information transmitted from the first STA to the AP or information measured by the AP,
    wherein the information transmitted from the first STA to the AP includes backoff retry count information, packet retransmission count information, and latest backoff interval information, and
    wherein the information measured by the AP includes BSS (Basic Service Set) average access delay information and per-access category access delay information.

3. A station (STA) of a wireless local area network (LAN) system, the STA including:
    a radio frequency (RF) unit that transmits and receives a radio signal; and
    a processor, operatively connected with the RF unit, that:
    controls the RF unit to receive initial access setup information from an access point (AP), wherein the initial access setup information includes a bit sequence including a first bit and a second bit,
    determines whether the first STA performs initial access based on the initial access setup information and initial access determination information of the first STA, wherein the first bit of the bit sequence included in the initial access setup information corresponding to the initial access determination information of the first STA indicates that the first STA is not allowed to access the AP, wherein the second bit of the bit sequence included in the initial access setup information corresponding to initial access determination information of a second STA indicates that the second STA is allowed to access the AP,
    obtains an initial access barring period corresponding to a value of the first bit, and
    performs the initial access within a determined period after the initial access barring period elapses, wherein the second STA performs the initial access before the determined period,
    wherein the initial access setup information is information for determining whether the first STA or the second STA perform the initial access,
    wherein the initial access setup information includes user priority information and access category information,
    wherein the user priority and the access category are information for indicating the type of traffic data of the first STA and the second STA, and
    wherein the initial access determination information of the first STA is information on the user priority and the access category corresponding to the first STA.

4. The STA of claim 3,
    wherein the initial access barring period is determined based on information transmitted from the first STA to the AP or information measured by the AP,
    wherein the information transmitted from the first STA to the AP includes backoff retry count information, packet retransmission count information, and latest backoff interval information, and
    wherein the information measured by the AP includes BSS (Basic Service Set) average access delay information and per-access category access delay information.

* * * * *